(12) United States Patent
Hou et al.

(10) Patent No.: US 6,416,076 B1
(45) Date of Patent: Jul. 9, 2002

(54) COLLAPSIBLE STROLLER

(75) Inventors: Hung-Chung Hou, Tai-Pao; Er-Jui Chen, Feng-Shan, both of (TW)

(73) Assignee: Link Treasure Limited, Tortola (VG)

( * ) Notice: Subject to any disclaimer, the term of this patent is extended or adjusted under 35 U.S.C. 154(b) by 0 days.

(21) Appl. No.: 09/642,210

(22) Filed: Aug. 17, 2000

(51) Int. Cl.⁷ .................................................. B62B 7/06
(52) U.S. Cl. ........................ 280/642; 280/647; 280/639
(58) Field of Search ................................ 280/647, 651, 280/639, 642, 644, 649, 650, 655, 658, 641, 42, 47.38, DIG. 5, DIG. 6, 657, 38

(56) References Cited

U.S. PATENT DOCUMENTS

| | | | | |
|---|---|---|---|---|
| 4,062,555 A | * | 12/1977 | Peng et al. | 280/42 |
| 4,386,790 A | * | 6/1983 | Kassai | 280/650 |
| 4,697,823 A | * | 10/1987 | Kassai | 280/644 |
| 4,759,566 A | * | 7/1988 | Kassai | 280/642 |
| 5,478,102 A | * | 12/1995 | Haung | 280/642 |
| 5,622,377 A | * | 4/1997 | Shamie | 280/642 |
| 5,669,623 A | * | 9/1997 | Onishi | 280/642 |
| 5,765,855 A | * | 6/1998 | Chiu | 280/642 |
| 5,775,718 A | * | 7/1998 | Huang | 280/642 |
| 5,893,577 A | * | 4/1999 | Takahashi | 280/642 |
| 6,062,589 A | * | 5/2000 | Cheng | 280/647 |
| 6,135,487 A | * | 10/2000 | Flannery et al. | 280/642 |
| 6,155,740 A | * | 12/2000 | Hartenstine | 403/102 |
| 6,241,273 B1 | * | 6/2001 | Gehr | 280/642 |
| 2002/0014752 A1 | * | 2/2002 | Huang | 280/47.25 |

FOREIGN PATENT DOCUMENTS

ES    0233133 A2 * 8/1987 ............. B62B/7/08

* cited by examiner

*Primary Examiner*—J. J. Swann
*Assistant Examiner*—J. Allen Shriver
(74) *Attorney, Agent, or Firm*—W. Wayne Liauh

(57) ABSTRACT

A collapsible stroller is movable between a collapsed position for storage and an operating position for transporting the passenger. The frame of the stroller comprises armrests, front leg tubes, rear leg tubes, and handles. In comparison with prior art there is no additional linkage provided by the invention. Also, latch as well as associated linkages and hinges are eliminated. In addition, the collapsing force is suitably transmitted to each component of the frame. Moreover, the handle is remained on top of the frame after collapsed, thus facilitating the future unfolding operation of the stroller.

11 Claims, 6 Drawing Sheets

COLLAPSIBLE STROLLER

BACKGROUND OF THE INVENTION

1. Field of Invention

The present invention relates to a collapsible stroller having the characteristics of convenient operation and reduced components.

2. Related Art

Collapsible strollers have been available for many years to provide convenient transportability. Conventionally, a stroller comprises a frame, a seat for receiving the passenger of stroller, and a number of (e.g., four) pairs of wheels rotatably mounted on the bottom ends of frame. Typically, safety is the most important factor in designing a collapsible stroller. Next, the convenience is also a factor. Preferably, a collapsible stroller should be folded into a minimum storage while not in use. A number of conventional collapsible strollers have been found such as U.S. Pat. Nos. 3,953,046, 4,094,053, 4,346,912, 4,369,986, 5,123,670, 5,417,450, 5,427,402, 5,499,831, 5,553,885, 5,622,377, 5,765,855, 5,769,447, and 5,882,030. All above prior art are movable between a collapsed position and an operating position by configuring a latch hinged among tubes of frame and a locking device provided on latch. As such, operator may manipulate the locking device and latch to collapse or unfold the stroller. It is known that a number of linkages are required to connect between the plurality tubes of frame for effecting the folding/unfolding of stroller. This inevitably complicates the components of prior art collapsible stroller.

Moreover, in some cases such locking devices are typically provided on the latch as stated above. But most locking devices are provided on handlebar for facilitating the locking/unlocking operation. As to this type of locking device, there are also a number of prior art. For example, U.S. Pat. Nos. 5,882,030 and 5,718,444, and Taiwanese Pat. Publication Nos. 268,407 and 242,764. These prior art disclose a collapsing technique wherein handlebar is pushed downward to a possible minimum elevation. This means locking device is moved together with handlebar to the minimum elevation. As such, in unfolding the stroller operator has to bend his/her back to reach locking device for manipulating. Then pull handlebar upward and unfold the frame to its operating position. In view of this, it is not convenient especially in the cases of the operator holding a baby or a heavy object with one hand, while manipulating the frame with the other hand.

One design is disclosed in U.S. Pat. No. 5,893,577 for solving above drawback. The handlebar of above prior art is remained on top of frame after collapsed, thus eliminating the bending of the operator's back in the future unfolding operation. But this is still unsatisfactory for the purpose for which the invention is concerned because a number of linkages are required to connect between the plurality tubes of frame for effecting the folding/unfolding of stroller. This also complicates the components of stroller.

SUMMARY OF THE INVENTION

It is therefore an object of the present invention to provide a collapsible stroller movable between a collapsed position and an operating position. The stroller comprises a frame consisting of two sub-frames each including an armrest, a front leg tube, a rear leg tube, a handle, a front base tube, a rear base tube, a joint member, a seat tube, and a back tube wherein the front leg tube is hinged to the front of the armrest and the rear leg tube is hinged to the rear of the armrest, the handle is inserted through a channel formed on the armrest to hinge to the joint member, the front base tube is hinged to the front leg tube and the joint member, and a basket is supported by the rear base tubes and the joint members. Moreover, two opposite apertures are provided in the channel and the handle comprises two lateral plungers and a spring coupled between the plungers. In a locked position, the plungers are extended into the apertures respectively by virtue of the spring, while the plungers are capable of being pressed inwardly until the plungers completely clear the apertures respectively to reach a free position to allowing a subsequent collapsing of the stroller. By utilizing the invention, in comparison with prior art there is no additional linkage provided. Also, latch as well as associated linkages and hinges are eliminated. In addition, the collapsing force is suitably transmitted to each component of the frame, thus smoothing the operation. Moreover, the handle is remained on top of the frame after collapsed, thus facilitating the future unfolding operation of the stroller.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description given hereinbelow illustration only, and thus are not limitative of the present invention, and wherein.

DETAILED DESCRIPTION OF THE INVENTION

Figure 1:
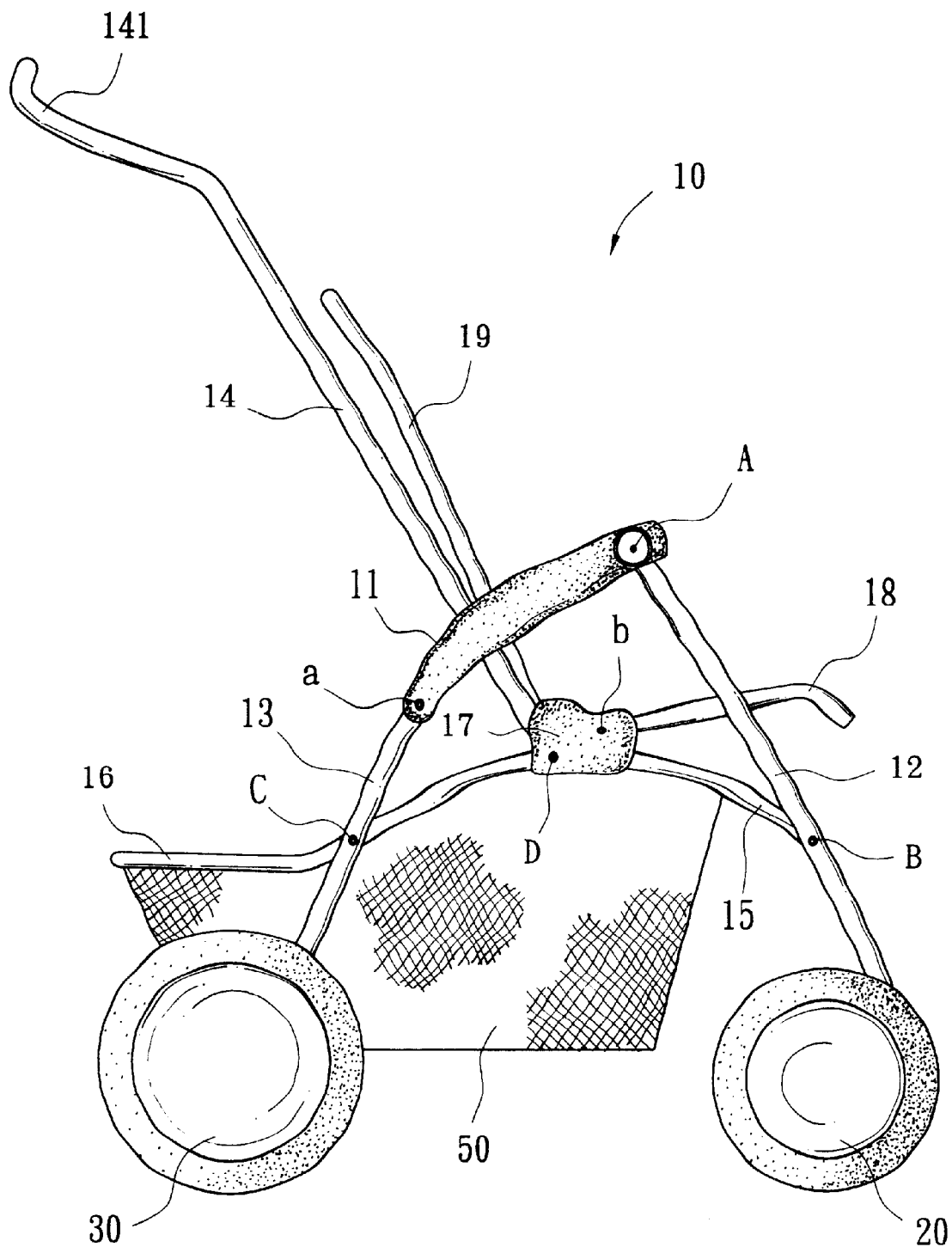
FIG. 1 is a side view of a first preferred embodiment of collapsible stroller according to the invention.
Figure 2:
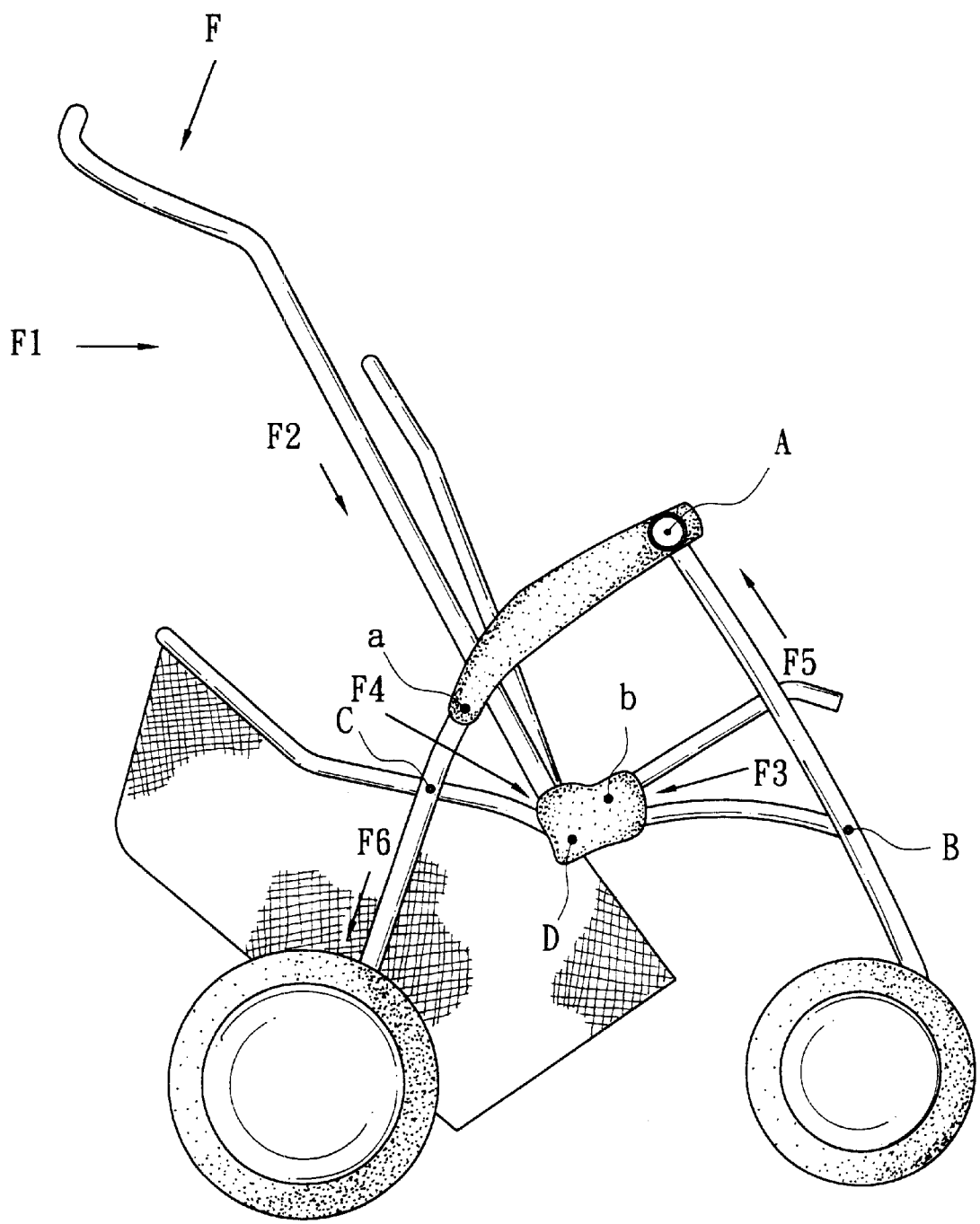
FIG. 2 is similar to FIG. 1 wherein the FIG. 1 collapsible stroller in a partially collapsed. position.

Referring to FIGS. 1 to 5, there is shown a first preferred embodiment of collapsible stroller constructed in accordance with the invention comprising a frame 10 consisting of a plurality of tubes each generally being circular in cross section. Frame 10 is movable between a collapsed position and an operating position. Note that only one of two sides of frame 10 will now be described in detail below because one side of frame 10 is a mirror image of the other side. The frame 10 comprises an armrest 11, a front leg tube 12, a rear leg tube 13, a handle 14, a front base tube 15, a rear base tube 16, a joint member 17, a seat tube 18, and a back tube 19. Armrest 11 is on the center of frame 10 formed as a front curve to protect the passenger. In some designs, a tray is releasably coupled to the armrests 11. Hinge A is coupled between the front of armrest 11 and front leg tube 12, while fixed pin (e.g., rivet) a is coupled between the rear of armrest 11 and rear leg tube 13. A channel 111 is through armrest 11 between hinge A and fixed pin a. Two opposed apertures 112, 113 are provided in channel 111. Two opposed extended outwardly slopes 114, 115 are provided below apertures 112, 113 respectively for facilitating operation. A resilient pad 116 is abutted on handle 14 for enclosing the top opening of channel 11. This resilient pad 116 served as safety device can prevent the hand of the passenger from inserting into the channel 111 (see FIGS. 4 and 5).

The bottom end of front leg tube 12 is pivotably coupled to front wheel 20. A hinge B provided between top end (i.e., hinge A) and bottom end (i.e., wheel 20) of front leg tube 12 is pivotably coupled to front base tube 15. Similarly, bottom end of rear leg tube 13 is pivotably coupled to rear wheel 30. A hinge C is provided between top end (i.e., fixed pin a) and bottom end (i.e., wheel 30) of rear leg tube 12 pivotably coupled to rear base tube 16.

Handle 14 has a bent portion on top formed as gripping portion 141 to provide user a means to push the stroller. Handle 14 is inserted through channel 111 of armrest 11. Handle 14 has a bottom hinge D pivotably coupled to joint member 17. Handle 14 further comprises a fixed pin b, two lateral plungers 41, 42, and a spring 43 coupled between plungers 41 and 42. In a locked (i.e., unfolded or operating) position, plungers 41, 42 are extended into apertures 112, 113 respectively by virtue of spring 43. Operator may press plungers 41, 42 inwardly until plungers 41, 42 completely clear apertures 112, 113 respectively. Thus then operator may collapse the stroller. At this time, plungers 41, 42 are in a free position.

Front base tube 15 has a rear end coupled to fixed pin b of joint member 17. Similarly, rear base tube 16 has a front end pivotably coupled to hinge D of handle 14. A basket 50 is supported by front base tubes 15 and rear base tubes 16 for retaining objects.

Seat tube 18 is fixed to joint member 17. Back tube 19 is pivotably coupled to joint member 17 such that operator may adjust the inclined angle thereof as desired. Seat tube 18 and back tube 19 form a sitting place for the passenger. Typically, a fabric (not shown) is covered on seat tube 18 and back tube 19 for providing the passenger a degree of comfort while sitting. It is possible to eliminate seat tube 18 and back tube 19 by directly covering the fabric on handle 14 and front leg tube 12 for the passenger to sit as long as there is no interference to the collapsing operation. It is also possible to eliminate joint member 17 by fixing front base tube 15 to handle 14 and pivotably coupling rear base tube 16 to hinge D of handle 14. It is still possible to mount seat tube 18 and back tube 19 on handle 14 directly. A sunshade is also possible to mount on armrest in addition to above-mentioned tray. Thus forms a complete exemplary stroller.

Figure 3:
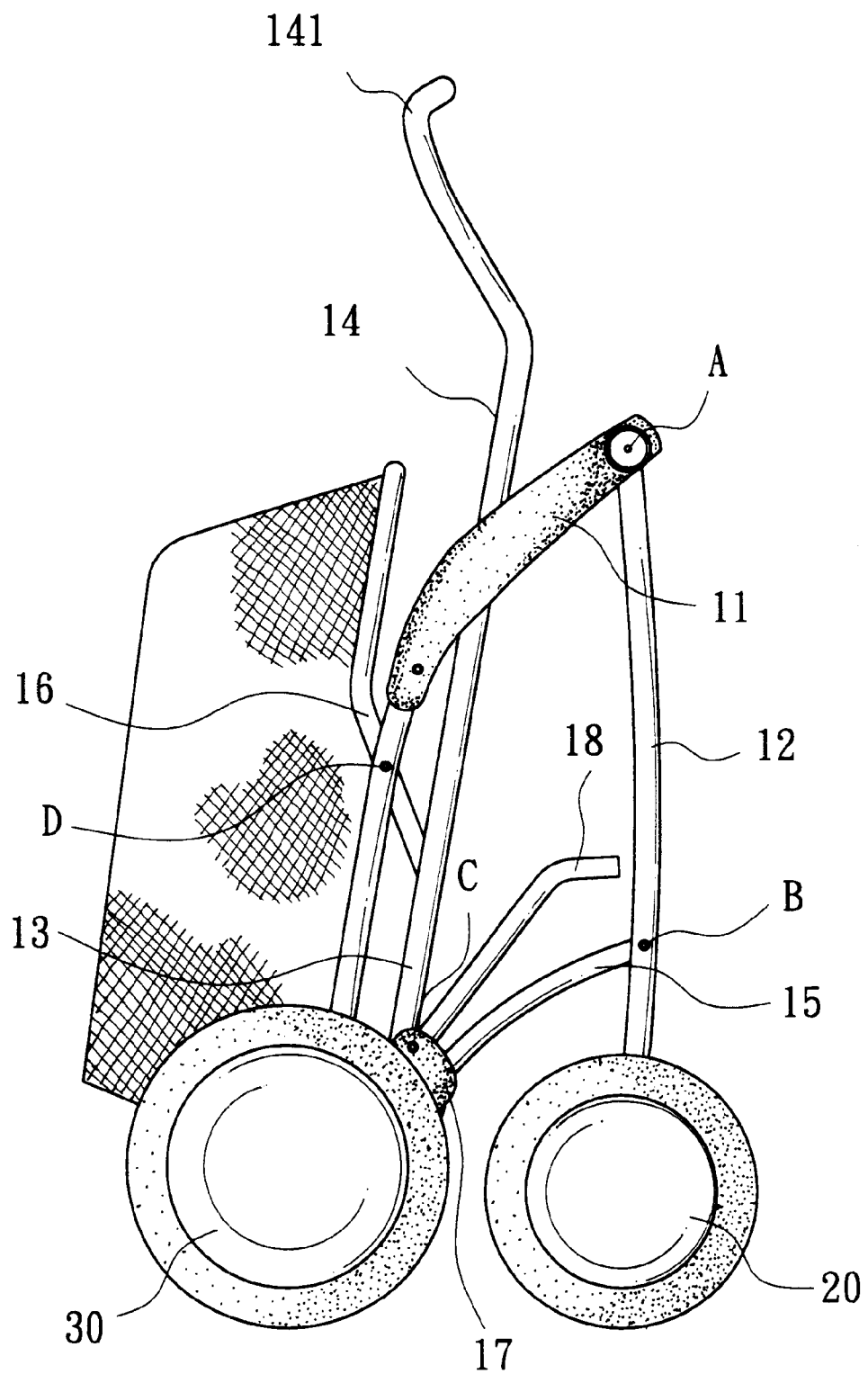
FIG. 3 is similar to FIG. 1 wherein the FIG. 1 collapsible stroller in a collapsed. position.
Figure 4:
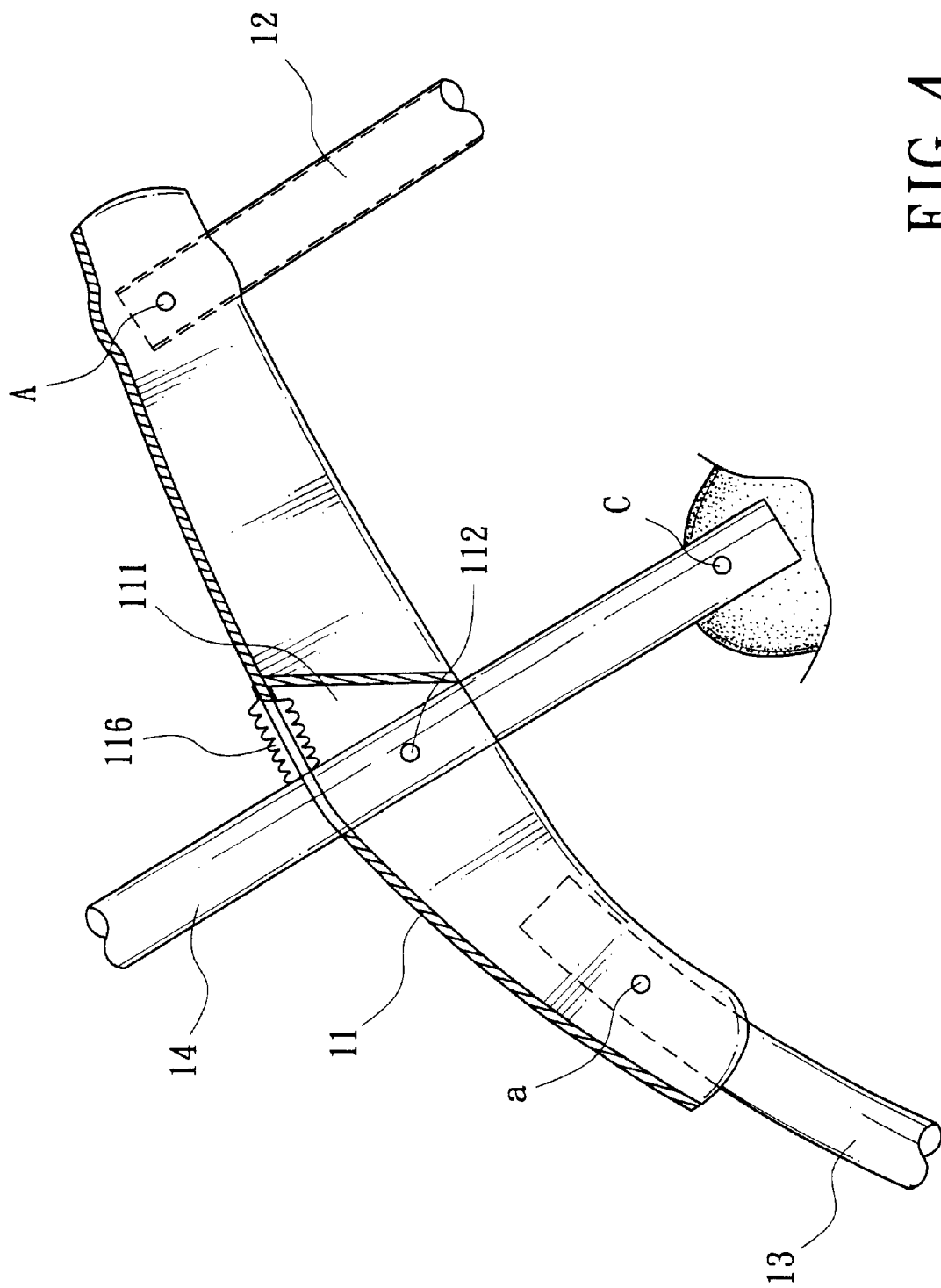
FIG. 4 is an enlarged cross-sectional view illustrating the operation of armrest and tubes of the FIG. 1 collapsible stroller.
Figure 5:
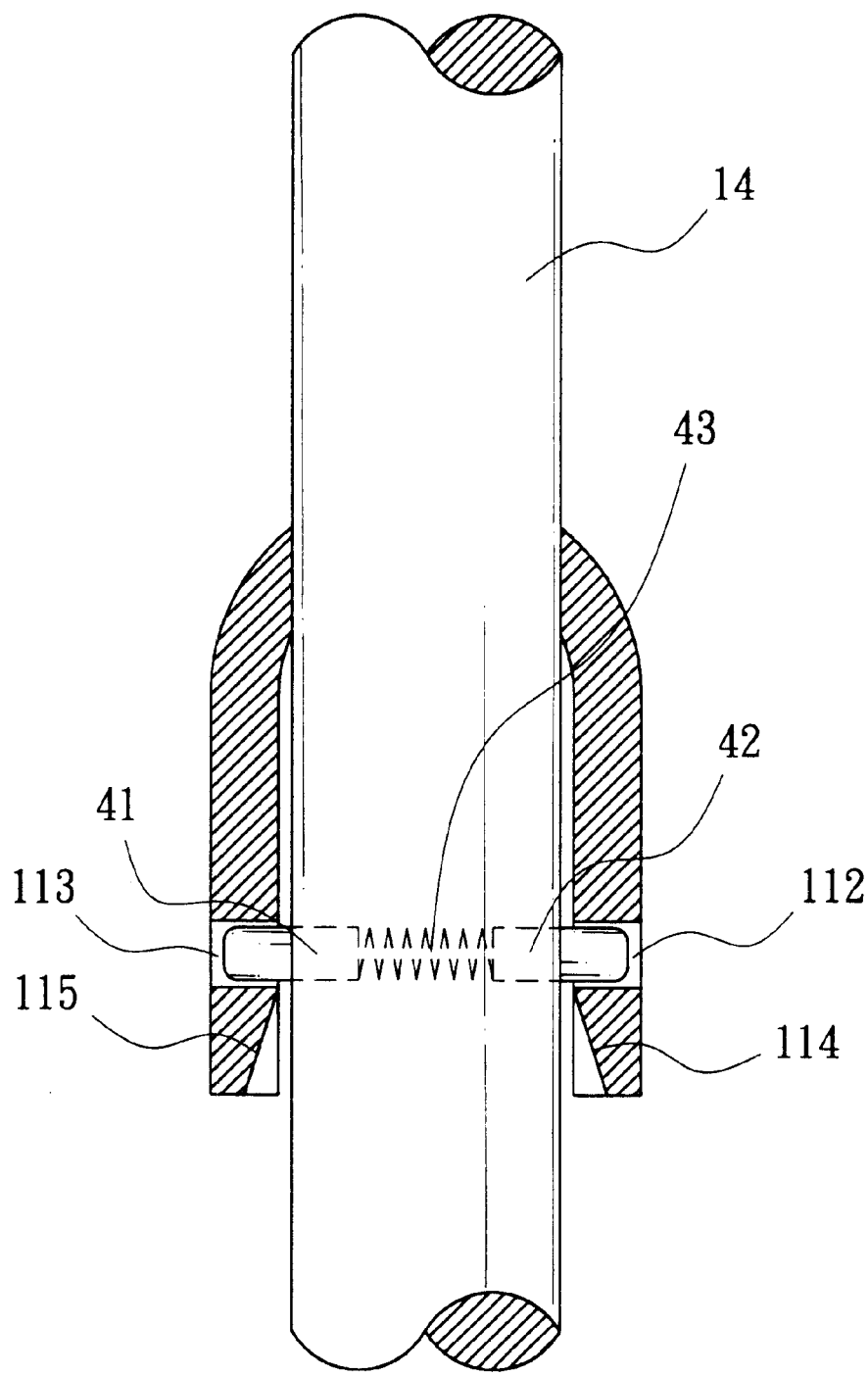
FIG. 5 is another enlarged cross-sectional view illustrating the operation of armrest and tubes of the FIG. 1 collapsible stroller.

Referring to FIG. 1, there is shown a first preferred embodiment of collapsible stroller according to the invention wherein frame 10 is fully unfolded and plungers 41, 42 are in a locked position. As such, stroller may receive and transport the passenger in a well known manner. In collapsing the stroller, first press plungers 41, 42 inward to become out of engagement with apertures 112, 113 respectively. Then push handle 14 downward by a force F (see FIG. 2). This force F comprises a horizontal component force F1 and a component force F2 along handle 14 to push handle 14 downward and forward. Force F is further applied to front base tube 15 and rear leg tube 13 through hinge D to create component forces F3 and F4 acting on joint member 17 wherein component force F3 pushes front base tube 15 to move front leg tube 12 toward handle 14. Above force F is again applied to front leg tube 12 to create an upward component force F5 therealong. Component force F5 pushes front leg tube 12 to move armrest 11 upward through hinge A. Also, component force F4 pushes rear base tube 16 to move rear leg tube 13 toward handle 14. Furthermore, force F is applied to rear leg tube 13 to create a downward component force F6 therealong to cause rear leg tube 13 to push armrest 11 downward for moving toward handle 14 until reaching a collapsed position as shown in FIG. 3. Seat tube 18 is not pivotable about joint member 17 (or handle 14) in collapsing the stroller. But seat tube 18 causes no interference to the collapsing operation of frame 10. Similarly, the pivotable back tube 19 is also collapsed without causing any interference to the collapsing operation of frame 10. Still similarly, the sunshade 60 is designed as foldable or detachable, thus causing no interference to the collapsing operation of frame 10.

By utilizing the invention, in comparison with prior art there is no additional linkage provided. Also, latch as well as associated linkages and hinges are eliminated. Further, gripping portion 141 of handle 14 is remained on top of frame 10 after collapsed because handle 14 is pushed downward during collapsing. Furthermore, control button and connecting cable (not shown) may be optionally provided on gripping portion 141 for facilitating the manipulation of plungers 41, 42 in collapsing the stroller.

As stated above, handle 14 is through channel 111 of armrest 11, whereby the lateral movement of handle 14 is defined in the channel 111.

Figure 6:
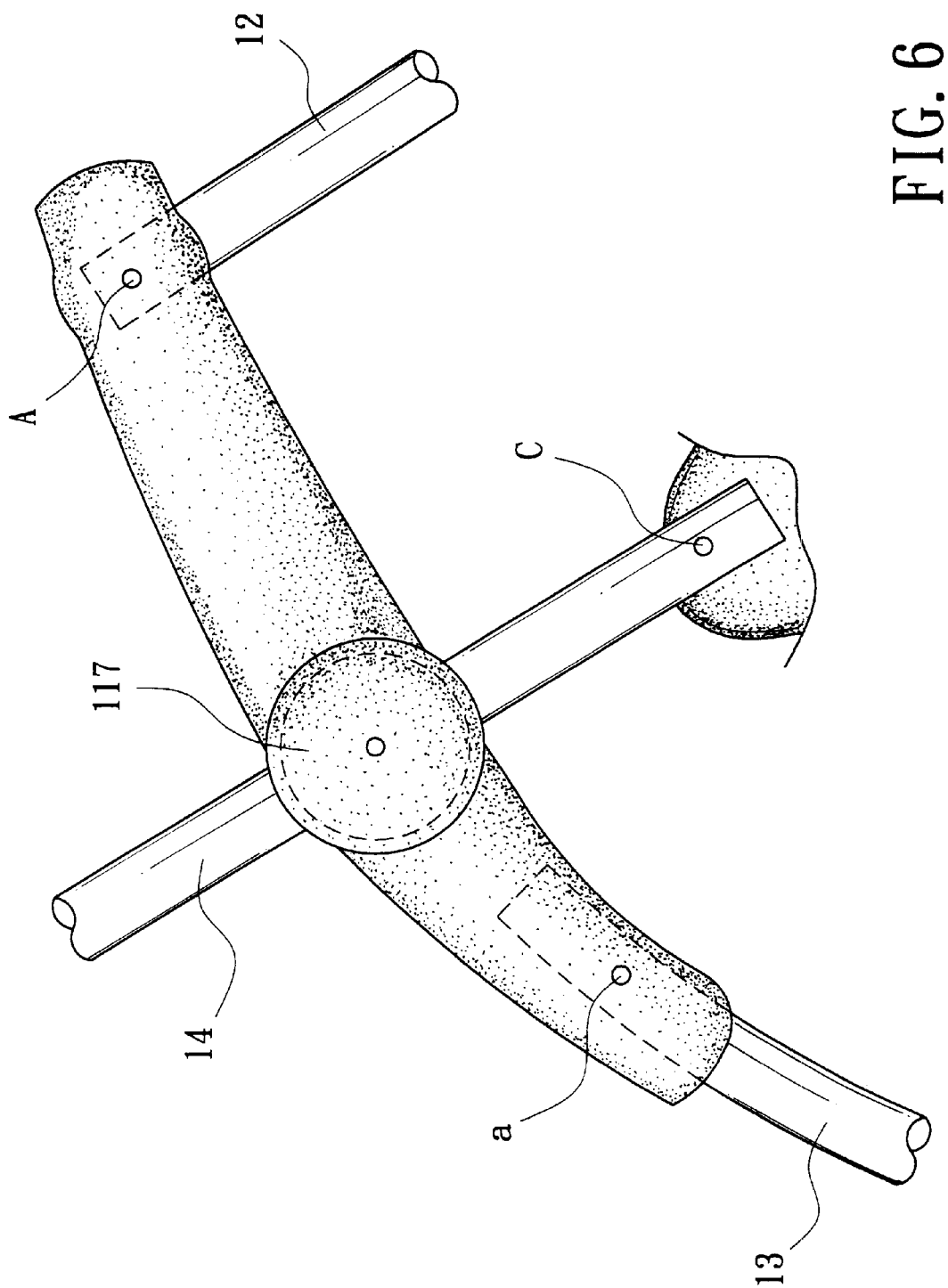
FIG. 6 is an enlarged cross-sectional view illustrating the operation of armrest and tubes of a second preferred embodiment of collapsible stroller according to the invention.

Referring to FIG. 6, there is shown a portion of a second preferred embodiment of collapsible stroller according to the invention. This embodiment comprises a rotatable first knob 117 on armrest 11 and a rotatable second knob 142 (not shown) on handle 14 pivotably coupled to the first knob 117. This design may more effectively transmit force to the tubes of frame 10 during collapsing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A collapsible stroller movable between a collapsed position for storage and an operating position for transporting a passenger, the stroller having a frame comprising two identical sub-frames, each sub-frame comprising:

an armrest;

a front leg tube having a top end pivotably coupled to the front of the armrest and a bottom end pivotably coupled to a front wheel;

a rear leg tube having a top end coupled to the rear of the armrest and a bottom end pivotably coupled to a rear wheel;

a handle;

a front base tube having a front end pivotably coupled to the front leg tube and a rear end coupled to the bottom end of the handle; and a rear base tube having a front end pivotably coupled to the bottom end of the handle and a predetermined portion coupled to the rear leg tube;

wherein in collapsing the stroller, the handle is pushed to cause the front base tube and the rear base tube to move toward the handle with respect to the bottom end of the handle, thereby causing the front base tube and the rear base tube to move the front leg tube and the rear leg tube to move toward the handle respectively;

further wherein the armrest comprises a through channel and at least one small hole through a wall of the channel, and the channel comprises a pad abutted on the handle for enclosing the opening of the channel.

2. The collapsible stroller of claim 1, wherein the channel further comprises at least one extended outwardly slope below the small opening.

3. The collapsible stroller of claim 1, wherein the handle is inserted through the channel, the handle further comprises at least one lateral plunger such that in a locked position, the plunger is extended into the small opening, while the plunger is out of engagement with the small opening in a free position.

4. The collapsible stroller of claim 3, wherein the handle further comprises a spring coupled to the plunger for effecting the engagement and the disengagement of the plunger and the small opening.

5. The collapsible stroller of claim 1, wherein the handle further comprises a top gripping portion.

6. A collapsible stroller movable between a collapsed position for storage and an operating position for transporting a passenger, the stroller having a frame comprising two identical sub-frames, each sub-frame comprising:

an armrest;

a front leg tube having a top end pivotably coupled to the front of the armrest and a bottom end pivotably coupled to a front wheel;

a rear leg tube having a top end coupled to the rear of the armrest and a bottom end pivotably coupled to a rear wheel;

an armrest;

a front leg tube having a top end pivotably coupled to the front of the armrest and a bottom end pivotably coupled to a front wheel;

a rear leg tube having a top end coupled to the rear of the armrest and a bottom end pivotably coupled to a rear wheel;

a handle;

a front base tube having a front end pivotably coupled to the front leg tube and a rear end coupled to the bottom end of the handle; and a rear base tube having a front end pivotably coupled to the bottom end of the handle and a predetermined portion coupled to the rear leg tube;

wherein in collapsing the stroller, the handle is pushed to cause the front base tube and the rear base tube to move toward the handle with respect to the bottom end of the handle, thereby causing the front base tube and the rear base tube to move the front leg tube and the rear leg tube to move toward the handle respectively;

further wherein the armrest comprises a through channel and at least one small hole through a wall of the channel, and the channel comprises a pad abutted on the handle for enclosing the opening of the channel.

7. The collapsible stroller of claim 1, wherein the handle further comprises a sunshade.

8. The collapsible stroller of claim 1, further comprising a basket supported by the front base tubes and the rear base tubes.

9. The collapsible stroller of claim 1, wherein the pad is made of a resilient material.

10. The collapsible stroller of claim 1, wherein the small opening has the shape as an aperture.

11. The collapsible stroller of claim 6, wherein the small opening has the shape as an aperture.

* * * * *